Dec. 5, 1933.  E. HILL  1,938,102
TOOL FOR REMOVING AND REPLACING SPRINGS
Filed Sept. 26, 1930
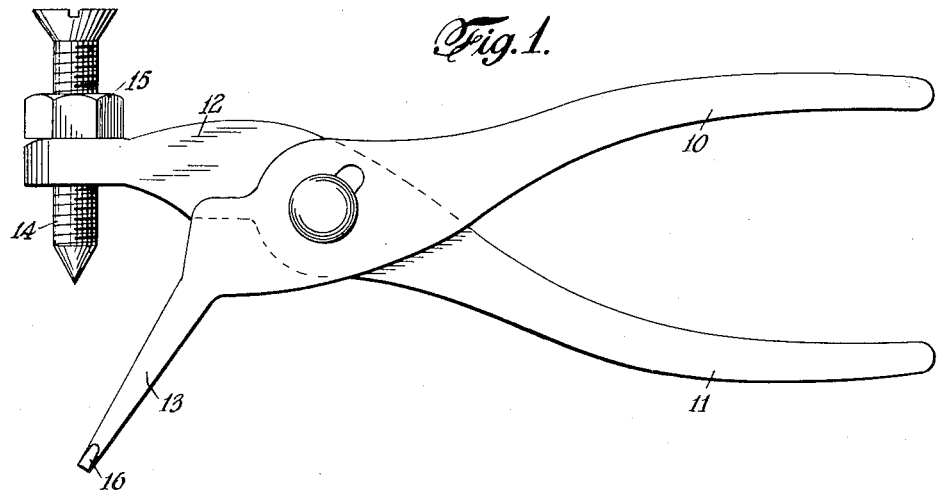
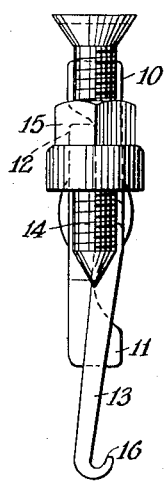
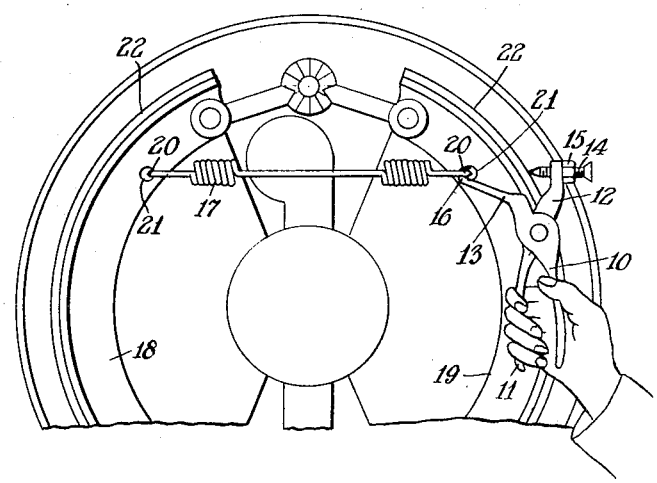
INVENTOR
EDWARD HILL
BY
ATTORNEY Patented Dec. 5, 1933

1,938,102

UNITED STATES PATENT OFFICE 1,938,102

TOOL FOR REMOVING AND REPLACING SPRINGS

Edward Hill, East Orange, N. J.

Application September 26, 1930
Serial No. 484,484

1 Claim. (Cl. 29—87.1)

The invention relates to a hand-operated tool for use in installing and removing the brake-retracting springs associated with the brake shoes of internally expanding service brakes of an automobile, more particularly of the Ford Model A type car. Considerable difficulty, annoyance, inconvenience and expense are experienced in attempting to remove and replace these springs in the manner heretofore conducted, as the same involves the removal of the emergency brake shoe with inner brake shield and cam arm in order to admit of access to a said spring.

It is an object of the present invention to provide a simple and effective tool to lessen the time required for releasing such springs when it is desired to reline a brake shoe as well as to restore the same to its position for operation, after the lining has been completed, and to effect this without necessitating removal of any of the emergency portion of the brake system. A further object of the invention resides in a manually operable tool of simple, rugged and inexpensive construction, and by means of which the relining operation is greatly facilitated and cost thereof reduced to a minimum.

In carrying out the invention, the novel tool is provided of two crossed members pivotally connected together between their ends and the one pair of ends serving as handle members for bringing together and effecting the separation of the other pair. This latter pair is constructed in a special manner, the one arm thereof retaining an adjustable abutment member and the other extending at an angle to the former and being provided with a terminal hook extending laterally therefrom and whereby, when the abutment is pressed against a rigid support as the brake-lining of a brake shoe, and the hook engaged with the turned-over end of a spring, the handles may be manipulated to either remove said spring or to set the same in position.

The nature of the invention, however, will best be understood when described in connection with the accompanying drawing, in which:

Fig. 1 is a front elevation of the novel tool, and Fig. 2 is a plan thereof.

Fig. 3 illustrates the tool operatively associated with a brake shoe for action on its spring.

Referring to the drawing, two crossed arm members are pivotally connected to each other between their ends at the overlapping parts to afford the handle portions 10 and 11 and the outer engaging or active portions 12 and 13. The one arm or end portion 12 extends substantially in line with its handle portion and is provided with a threaded socket through which operates a screw 14 pointed at its inner end and adapted to be locked in adjusted position by means of a nut 15 working thereon between the head of the screw and the arm. The other end portion is in the nature of a finger 13 which extends at an angle to the arm 12, of approximately 45°, and terminates in a hook 16 directed laterally outwardly therefrom, the portions 12, 13 and the screw 14 lying substantially in the same plane.

In operating the tool for the installation or removal of a spring such as the spring 17 which acts to retract the brake shoes 18 and 19, it will be understood that such spring has turned-over ends 20 fitting into corresponding openings or holes 21 of the brake shoes; and the hook 16 is adapted to fit under such turned-over spring end. The pointed end of the screw 14 is rested against the outer surface of the brake shoe or rather lining 22 thereof, after having first been adjusted to allow for the necessary extent of movement of the hook-terminated arm which is brought between the usual brake shield plates; and one end of the spring is fitted into its corresponding opening while the hook is inserted under the turned-over other end of the spring.

Thereupon, the handle members are pressed together to extend the spring sufficiently to bring its said turned-over end over the corresponding opening of the brake shoe; and upon releasing the pressure on the handle portions, said end may be guided to and caused to drop into said opening to set the spring in position.

When it becomes necessary to remove the spring, the operation is substantially similar, the hook 16 being first placed under the turned-over end of a spring and the handle members brought together to extend said spring and raise the said end out of the opening, whereupon it is withdrawn laterally by movement of the tool as a whole to free the spring, and the tension thereon is then released by opening the handle members.

In the use of this tool, the slow and tedious work heretofore necessary for the setting or removal of a spring of this nature is overcome, together with the expense entailed therewith, it being possible to effect the entire operation in the course of only a few minutes rather than in a period of from one to two hours heretofore necessary.

I claim:

A tool for removing and replacing automobile brake shoe springs, comprising a pair of crossed members pivotally connected to each other at the overlapping parts, one of a pair of ends thereof affording handle portions adapted for manipulation of the other and active pair of ends, the one of said pair of active ends being provided with a hook for engaging a spring end and extending laterally outwardly, and an adjustable abutment element supported by the other of the active ends, said abutment and active ends all lying substantially in the same plane.

EDWARD HILL.